US00RE41543E

(19) United States
(12) Reissued Patent
Satchell, Jr. et al.

(10) Patent Number: US RE41,543 E
(45) Date of Reissued Patent: Aug. 17, 2010

(54) VENDING MACHINE AND COMPUTER ASSEMBLY

(75) Inventors: James A. Satchell, Jr., Tuskegee, AL (US); Johnson A. Asumadu, Kalamazoo, MI (US)

(73) Assignee: Vendonet, Inc., Tuskegee, AL (US)

(21) Appl. No.: 09/686,626

(22) Filed: Oct. 12, 2000

Related U.S. Patent Documents

Reissue of:
(64) Patent No.: 5,822,216
Issued: Oct. 13, 1998
Appl. No.: 08/715,232
Filed: Sep. 18, 1996

U.S. Applications:

(63) Continuation-in-part of application No. 08/429,583, filed on Aug. 17, 1995, now abandoned.

(51) Int. Cl.
*G06F 17/00* (2006.01)

(52) U.S. Cl. ..... 700/232; 700/241; 700/237; 705/16

(58) Field of Classification Search ..... 700/232, 700/241, 231, 233–238, 244; 705/16, 17, 705/26, 27, 5, 410; 709/203, 217, 229; 221/7, 221/2, 3, 8, 9, 199; 463/48; 369/24.01; 386/97; 235/381; 340/541; 379/93.22; 361/683
See application file for complete search history.

(56) References Cited

U.S. PATENT DOCUMENTS

| | | | | | |
|---|---|---|---|---|---|
| 1,697,537 | A | | 1/1929 | Mills | |
| 4,454,670 | A | | 6/1984 | Bachmann et al. | 40/584 |
| RE32,115 | E | * | 4/1986 | Lockwood et al. | 235/381 |
| 4,677,565 | A | | 6/1987 | Ogaki et al. | 235/381 |
| 4,789,907 | A | * | 12/1988 | Fischetti et al. | 386/107 |
| 4,839,505 | A | * | 6/1989 | Bradt et al. | 235/381 |
| 4,954,697 | A | * | 9/1990 | Kokubun et al. | 235/381 |
| 5,090,589 | A | * | 2/1992 | Brandes et al. | 221/2 |
| 5,091,713 | A | * | 2/1992 | Horne et al. | 340/541 |
| 5,117,407 | A | | 5/1992 | Vogel | 360/12 |
| 5,239,480 | A | | 8/1993 | Huegel | 364/479.11 |
| 5,441,047 | A | * | 8/1995 | David et al. | 128/670 |
| 5,445,295 | A | * | 8/1995 | Brown | 221/3 |
| 5,513,117 | A | * | 4/1996 | Small | 700/233 |
| 5,550,746 | A | * | 8/1996 | Jacobs | 700/231 |
| 5,561,604 | A | | 10/1996 | Buckley et al. | 364/479.05 |
| 5,602,905 | A | * | 2/1997 | Mettke | 379/93.22 |
| 5,608,643 | A | | 3/1997 | Wichter et al. | 364/479.11 |
| 5,637,845 | A | * | 6/1997 | Kolls | 235/381 |
| 5,646,819 | A | * | 7/1997 | Hill, III | 361/683 |
| 5,699,328 | A | * | 12/1997 | Ishizaki et al. | 369/24.01 |
| 5,748,485 | A | * | 5/1998 | Christiansen et al. | 700/234 |
| 5,761,071 | A | * | 6/1998 | Bernstein et al. | 700/237 |
| 5,769,269 | A | * | 6/1998 | Peters | 221/7 |
| 5,822,737 | A | * | 10/1998 | Ogram | 705/26 |
| 5,953,504 | A | * | 9/1999 | Sokal et al. | 709/227 |
| 6,048,271 | A | * | 4/2000 | Barcelou | 463/48 |
| 6,477,514 | B1 | * | 11/2002 | Gil et al. | 705/410 |

FOREIGN PATENT DOCUMENTS

| | | | |
|---|---|---|---|
| EP | 0564736 | * | 10/1993 |
| JP | 0036684 | * | 2/1991 |
| WO | 8907807 | * | 8/1989 |

OTHER PUBLICATIONS

Wired, Issue 1, Jul. 3/Aug. 1993 "Internet Vending Machines", by Kevin Kelley.

* cited by examiner

*Primary Examiner*—Albert DeCady
*Assistant Examiner*—Steven R Garland
(74) *Attorney, Agent, or Firm*—Novak Druce & Quigg LLP

(57) ABSTRACT

A vending machine for purchasing selected items by a customer. The vending machine includes a dispensing assembly for dispensing an item and a selector assembly connected to the dispensing assembly. A computer assembly having a central computer, video display screen and a modem is connected to and actuated by the selector for connecting the computer to an internet site and displaying a received transmission on the video screen in response to a purchased item.

93 Claims, 10 Drawing Sheets

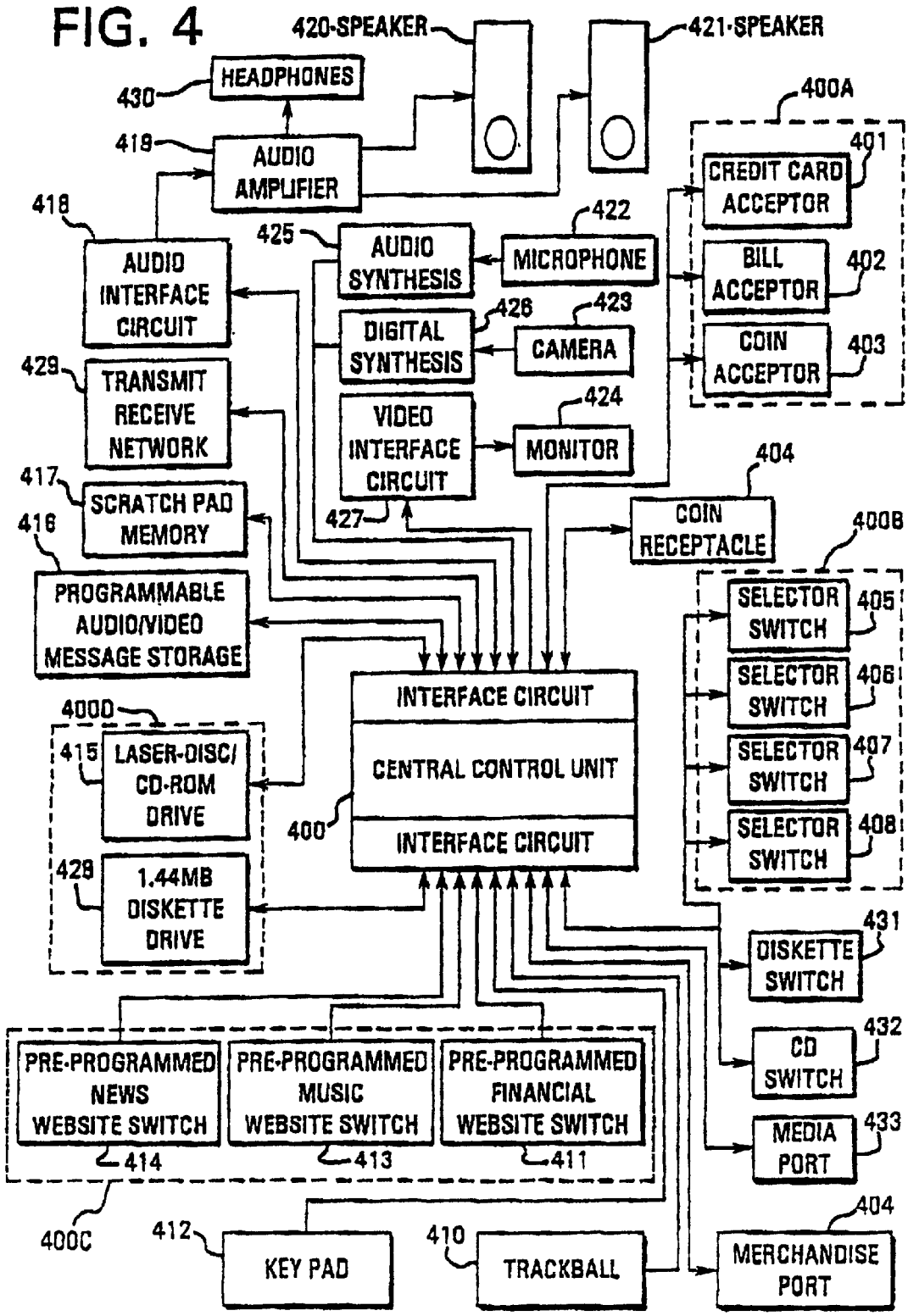
FIG. 4
420-SPEAKER
421-SPEAKER
HEADPHONES
430
419
AUDIO AMPLIFIER
400A
401
CREDIT CARD ACCEPTOR
418
AUDIO INTERFACE CIRCUIT
425
AUDIO SYNTHESIS
422
MICROPHONE
BILL ACCEPTOR
402
426
423
DIGITAL SYNTHESIS
CAMERA
COIN ACCEPTOR
403
429
TRANSMIT RECEIVE NETWORK
VIDEO INTERFACE CIRCUIT
424
MONITOR
404
417
SCRATCH PAD MEMORY
427
COIN RECEPTACLE
400B
416
PROGRAMMABLE AUDIO/VIDEO MESSAGE STORAGE
SELECTOR SWITCH
405
SELECTOR SWITCH
406
INTERFACE CIRCUIT
400D
415
LASER-DISC/ CD-ROM DRIVE
CENTRAL CONTROL UNIT
SELECTOR SWITCH
407
400
INTERFACE CIRCUIT
SELECTOR SWITCH
408
428
1.44MB DISKETTE DRIVE
431
DISKETTE SWITCH
PRE-PROGRAMMED NEWS WEBSITE SWITCH
PRE-PROGRAMMED MUSIC WEBSITE SWITCH
PRE-PROGRAMMED FINANCIAL WEBSITE SWITCH
CD SWITCH
432
414
413
411
MEDIA PORT
433
400C
412
KEY PAD
410
TRACKBALL
404
MERCHANDISE PORT

VENDING MACHINE AND COMPUTER ASSEMBLY

Matter enclosed in heavy brackets [ ] appears in the original patent but forms no part of this reissue specification; matter printed in italics indicates the additions made by reissue.

CROSS-REFERENCE TO RELATED APPLICATION

This application is a continuation-in-part application of prior application Ser. No. 08/429,583 filed Aug. 17, 1995, now abandoned.

FIELD OF THE INVENTION

The present invention is directed to a vending machine for purchasing merchandise while providing the customer via an internal computer with access to the internet or other on-line computer database and allowing the customer to interface with the internet address. More particularly, the invention is directed to a retrofit door assembly for attaching to an existing vending machine where the retrofit door includes a computer assembly to connect with the internet automatically in conjunction with the purchase of merchandise.

BACKGROUND OF THE INVENTION

Vending machines have been in common use for many years for purchasing a variety of items. These vending machines typically have a plurality of selector buttons or switches to allow the customer to select a specific item. Vending machines have also been produced to display advertising material from an electronic data storage unit at the time of purchase of the item.

Home computers are also in common use today for obtaining vast quantities of information from various databases. There are large numbers of database accessible by home computers through the use of a modem or other cable or telephone connection. In recent years the internet has become widely accessible by home computers for providing information to the user. Internet sites provide new entertainment and other sources of information.

Many vending machines provide vending for cans, bottles, hot and cold drinks in cups, sandwiches, candy, combs and different products. In addition to providing vending, other vending machines allow access to information which is localized and therefore, has limited use.

In recent years, there have been improvements in vending machines, including advertising, and interactive customer communication. For example, three such machines are exemplified by U.S. Pat. No. 4,454,670 to Bachmann, et al., International Patent No. PCT/AU89/00051 to Vogel, et al., and U.S. Pat. No. 4,677,565 to Ogaki et al. These patents disclose vending machines that have prerecorded programs on tape cassette or diskette in a tape or diskette drive of the machine and a screen. The menus from the diskette, displayed on the screen, provide interactive user interface by way instructions, operation and use of the vending machine, advertising, and video games.

The vending machines mentioned above have been successful and have achieved their designed objectives but the amount of information available to the customer is limited by pre-recording.

SUMMARY OF THE INVENTION

The present invention is directed to credit card, bill, and coin-operated vending machines and vending machine doors for purchasing merchandise such as soft drinks in bottles, plastic containers or cans as well as any other item or merchandise which can be purchased through a vending machine. More specifically, the present invention provides a vending machine for purchasing an item while providing the customers with interactive access to the internet, homepages, websites or other on-line computer service with audio, video capabilities, and multi-media capabilities. Further, the vending machine can transmit and receive data, with transmission and downloading capabilities of audio and video signals, using read and writable laser-disc or CD-ROM, and 1.44 MB diskette. Finally, the vending machine provides entertainment in addition to the vital information needed in the present technological age. The vending machine is reliable, efficient, fast operation and is manufacturable at relatively low cost.

An object of the present invention is to provide a credit card, bill or coin-operated machine for dispensing a selected item and includes a computer assembly for enabling the customer access to the internet, websites or home pages or other on-line computer database.

An additional object of the present invention is to provide a flat panel super video graphic adapter screen for providing video interactions by the customer with the internet.

An additional object feature is to provide stereophonic speakers for audio display of signals received from internet site.

A further object is to provide a telephone connection, cable, modem or an antennae such as satellite receiver or satellite disc mounted on an isolated vending machine for accessing the internet address.

Another object of the present invention is to provide a vending machine with computer-controlled panel keyboard and monitor to provide two-way interactive visual communications by a customer with the internet. By way of example and not limitation, the panel keyboard allows the addresses of the internet, web sites or home pages to be entered by the user into the computer for connecting the computer with an internet address.

A further object of the present invention is to provide a vending machine and computer assembly, with a trackball or mouse to provide two-way interactive visual communications between the customer and the internet address through the video monitor. By way of example and not limitation, the trackball allows the pages of websites or homepages to be browsed as well as other computer functions and operations using known software and hardware.

Still another object of the present invention is to provide a vending machine with a programmable selection panel for setting web sites or home pages for selected internet sites to provide, for example, a music function, news function, and audio and visual recording functions. By way of example and not limitation, the customer actuates the selection panel on the vending machine to access the present news on a homepage of a satellite news broadcast, or access the homepage of a musician, a political candidate, local government or the like.

A further object of the present invention is to provide a vending machine with read and writable laser-disc or CD-ROM player and 1.44 MB diskette driver to provide audio and video interaction between customer and machine and also to provide a means to allow the customer to download data, audio and video from a website, homepage or other on-line computer service. By way of example and not limitation, a customer can download data from a financial house or news from a broadcast company, and music and video from the homepage of a musician.

A further object of the invention is to provide a vending machine with a camera system to record the live performances of customers to be captured for TV commercial and for audio. By way of example and not limitation, a customer can access a homepage of a company and audition for a TV commercial for promotional use or by two-way performances via the internet.

A further object of the present invention is to provide a vending machine for accessing the website or the homepage information of a vendor at the location of the vending machine via the internet when the item or merchandise selection is made. By way of example, the homepage of a city or locality is displayed on the monitor for a vending machine located in city hall.

These and other objects of the invention are basically attained by providing a storage unit for storing a plurality of different items for sale and a dispensing mechanism for dispensing the items from said storage unit; a selector device for selecting one or more of said items for sale by a customer; a payment-control device for detecting an amount of payment required for sale of an item and for actuating said dispensing mechanism when a payment is received to dispense a selected item; and a computer assembly having a computer, video display screen and a modem, whereby said computer is connected to and actuated by said selector device for automatically connecting said computer to a preselected internet address or on-line computer service and automatically displaying information transmitted and received from said internet address or on-line computer service on said video screen for viewing by the customer.

These and other embodiments, features and advantages of the present invention will become apparent from the following detailed descriptions in addition to the accompanying drawings.

BRIEF DESCRIPTION OF THE DRAWINGS

Referring to the drawings which form a part of this original disclosure.

FIG. 4 is a functional block diagram of the computer operated vending machine of FIG. 1, illustrating a background central control unit and other components of the computer assembly and vending machine;

DETAILED DESCRIPTION OF THE INVENTION

Figure 1:
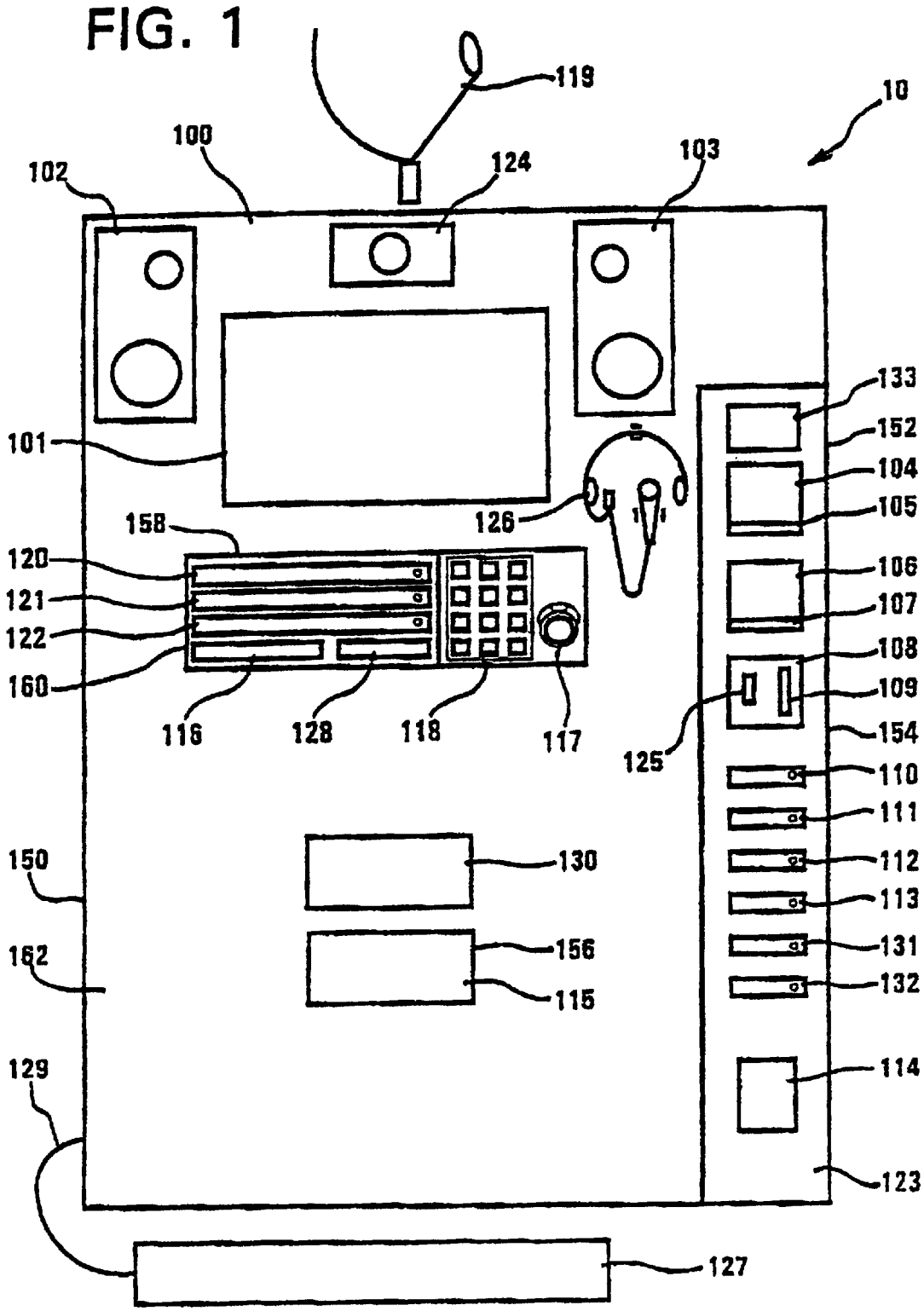
FIG. 1 is a front elevational view of the front panel portion of an alternative vending machine door.

Referring to the drawings, the vending machine 10 of the invention includes a front door 100 having a front panel 150. Typically, front panel is flat but can be any desired shape or structure. The vending machine 10 includes a payment control device 152, selector device 154, a merchandise or item storage unit dispensing mechanism 156, and a computer assembly 158.

The item storage unit and dispensing mechanism 156 can be any standard assembly commonly used in vending machines and will not be discussed in detail. Examples of vending mechanisms are disclosed in U.S. Pat. Nos. 4,454,670; 4,677,565; 4,954,697; and 4,380,130 which are hereby incorporated by reference in their entirety. The storage unit and dispensing mechanism is connected to and operated by the computer assembly 158.

The computer assembly 158 includes a video monitor or screen 101, actuating buttons 120, 121 and 112 of the selector panel 160, a key pad 118, trackball 117, CD-ROM drive 116, and a diskette drive 128. The computer assembly 158 is connected to and actuated by the selector assembly 154 such that when the customer selects an item to be purchased the computer is automatically activated to be operated by the customer. In one embodiment of the invention the computer is pre-programmed so that when an item is selected for purchase, the computer automatically connects to a preselected internet site or website and displays the information received from the internet site on the video monitor. For example, the computer can be programmed to connect to a website or homepage of the manufacturer of the item purchased, or the website or homepage owner or operator of the vending machine. In further examples, the computer can connect to the website or homepage of a local or national news or sports network or the like. In preferred embodiments, the computer will include a suitable timing device to provide the customer with a predetermined amount of time to view the displayed information and provide interactive communication via the computer. Additional time can be obtained by the user by further payment to the vending machine. In further embodiments, information stored in a suitable data storage unit, such as a CD-ROM can be used for displaying information to the customer on the video monitor. As used herein, the term internet refers to the numerous computer databases and on-line services available for public access for retrieving and/or sending information.

The vending machine door 100 is provided with an escutcheon plate 123 and a flat plastic transparent plastic panel 162 with suitable back lighting and coloring (not shown) configured to display a primary product logo or trademark of the vendor or manufacturer and to increase the visibility of the vendor. In one embodiment of the invention, the door 100 is constructed as a retrofit to an existing vending machine. In this embodiment, the computer assembly 158 and money acceptor 152 are mounted in the door and assembled to cooperate with the existing dispensing mechanism 156 of the vending machine 10.

The vending machine door 100 includes the video graphic screen 101 to provide the visual illustrations in color to enable the customer two-way interactive communication functions. By way of example, the screen 101 may be a flat panel super video graphic adapter active matrix video screen that allows the customer to browse website, homepages, and stored video images at photo realistic images of over sixteen million colors. The screen 101, as will be described later, is also used to display instructions to the customer for operation of the vending machine and to provide information for sales, purchasing and internet operations. When the machine is idle, a suitable vendor message is periodically delivered on screen 101 from the data storage unit of the computer.

The machine door 100 of the present invention further includes two speakers 102 and 103 connected to the computer assembly 158 that are operable to present audio to enable the customer to interact with the vending machine screen 101 and computer assembly 158. The speakers can be, for example, stereophonic speakers to allow the customer to listen to stereophonic music from website of musicians.

By way of example, the system of FIG. 1 also includes a plurality of selector buttons or switches 120, 121 and 122 connected to the computer assembly 158 to enable the customer to log onto preprogrammed internal sites, such as news, financial, or video music websites and homepages.

The vending machine and system of FIG. 1 of the present invention also includes keypad 118 connected to the computer assembly 158 to allow the customer to engage in the interactive visual communication on the screen 101. Using the keypad 118, the customer can enter information to access the internet and access and browse websites and homepages, and to receive and transmit data to a remote suitable receiver capable of receiving and utilizing data such as a facsimile or another computer equipped with a facsimile board.

A trackball 117 is connected to the computer 158 for use by the customer in the interactive visual communication functions on the screen 101. By way of example, the customer can use the trackball 117 to browse websites and homepages, gain access to internet, data, audio, and visual signals at the control location of the vending machine.

The vending machine door 100 of the present invention is further provided with a laser-disc or read and writable CD-ROM drive 116 and 1.44 MB diskette drive 128 connected to the computer 158 to enable the customer to download audio and visual signals from websites and homepages, and to receive data from remote data transmitters. Using drives 116 and 128 the customer may also send audio and video messages to websites and homepages, capable of receiving information and to transmit data to remote receivers.

In accordance with this invention, a camera 124 is mounted on the door 100, and headphone and microphone 126 are provided for generating audio-video signals of the customer. The camera 124 and microphone 126 are connected to the computer and a video and audio receiver and storage unit for recording the audio visual signals from the customer. By way of example and not limitation, camera 124 allows the customer to audition for a movie studio or a TV commercial through the internet access. Alternatively, the customers can connect the computer to an internal site and receive music from the site. The customers can then sing into the microphone with the customer's voice and music recorded on a CD or other recording medium.

The escutcheon plate 123 of the present invention is provided with a credit card reader 105 with indicator 104, a bill reader 107 with indicator 106, coin acceptor 109 with indicator pad 108 indicating the amount of money deposited, a coin return lever 125, a coin return/delivery receptacle 114 for change or return of coin, a blank compact disc and blank diskette delivery port 130, and a purchased item delivery port 115. Selection switches 110, 111, 112, 113 are connected to the computer to display information about any of the available merchandise for sale and for purchasing merchandise. The selector switches correspond to the selection buttons of a conventional vending machine. Selector switch 131 displays information about or purchase of blank diskette or compact disc. The credit card reader and indicator 104, the bill reader and indicator 106, the coin acceptor 109 and indicator 108, the coin return lever 125, the coin delivery receptacle 114, and the merchandise delivery port 115 are similar to those employed in the conventional vending machines.

The present invention may also be provided with the widow 133 for pricing information for merchandise, pricing information for accessing the internet and how long the customer may access the internet when a purchase is made, as well as other instructions for the customer. Once the correct amount of money has been deposited for the selected merchandise and a selector switch activated, the homepage of the vendor, the internet access, pricing information, or all the special instructions in connection with the initiation to access websites and homepages are displayed on the monitor 101. The selector switches actuate the dispensing device to dispense the purchased item.

The present invention, as shown in FIG. 1, is provided with a communication network, such as, an antennae, satellite disc 119 with satellite receiver 127 connected to the computer assembly 158 by a cable 129, for automatic transmit-receive data and audio-video signals, and to enable access to the internet through the use of the antennae, a modem, and other necessary hardware and software.

Figure 2:
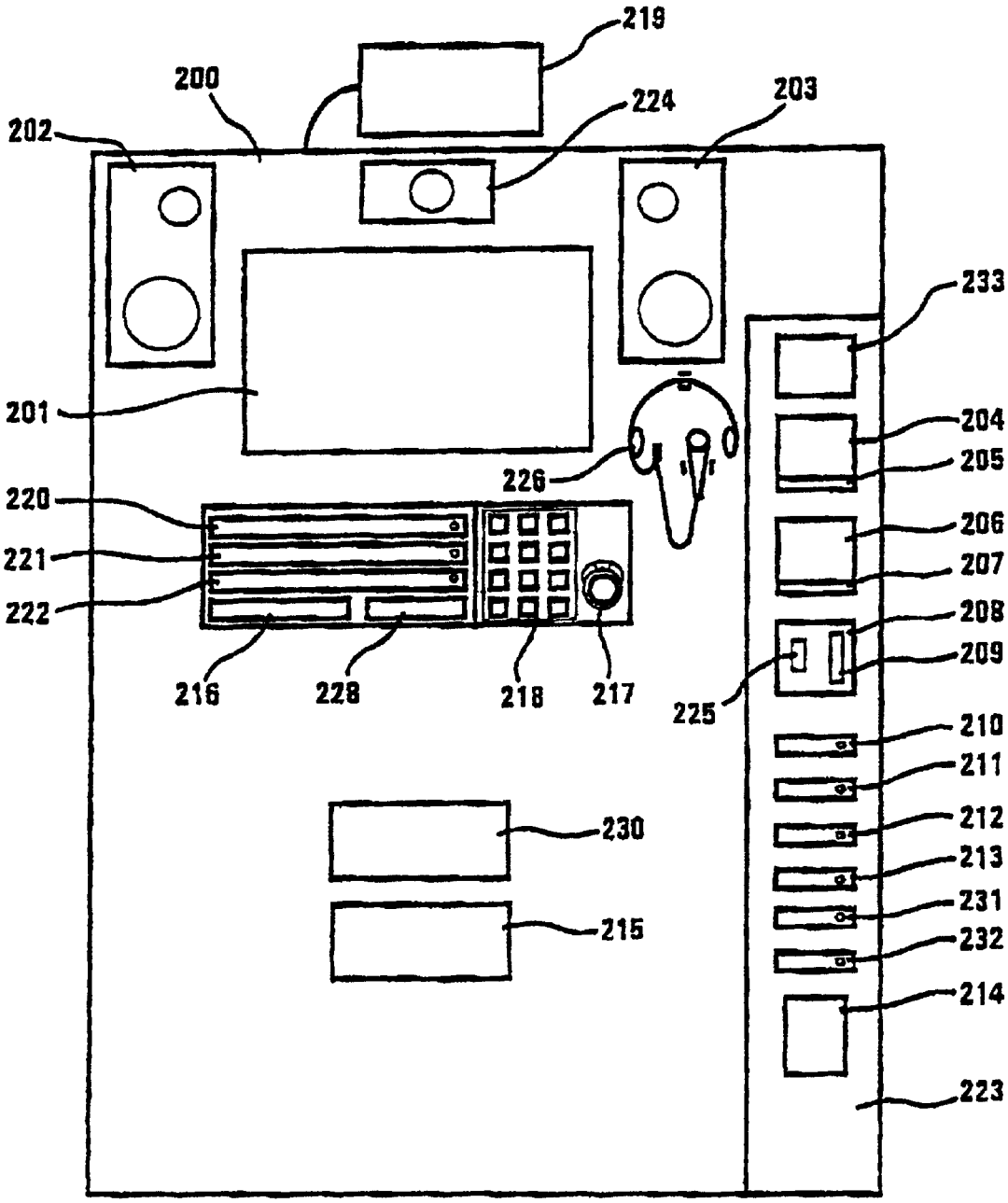
FIG. 2 is a front elevational view of the front panel portion of an alternative vending machine door.

A further embodiment of the present invention, shown in FIG. 2, is similar to FIG. 1 except that the communication network 219 may be a cable connecting the computer to a television signal provided at the vendor's location or a telephone line for the transmit-receive of the data, audio-video signals, and access to the internet. Alternatively, the communication network 219 may be any other suitable transmit-receive circuit. The remaining elements are substantially the same as in the embodiment of FIG. 1 and are identified by the same reference number of the 200 series.

Figure 3:
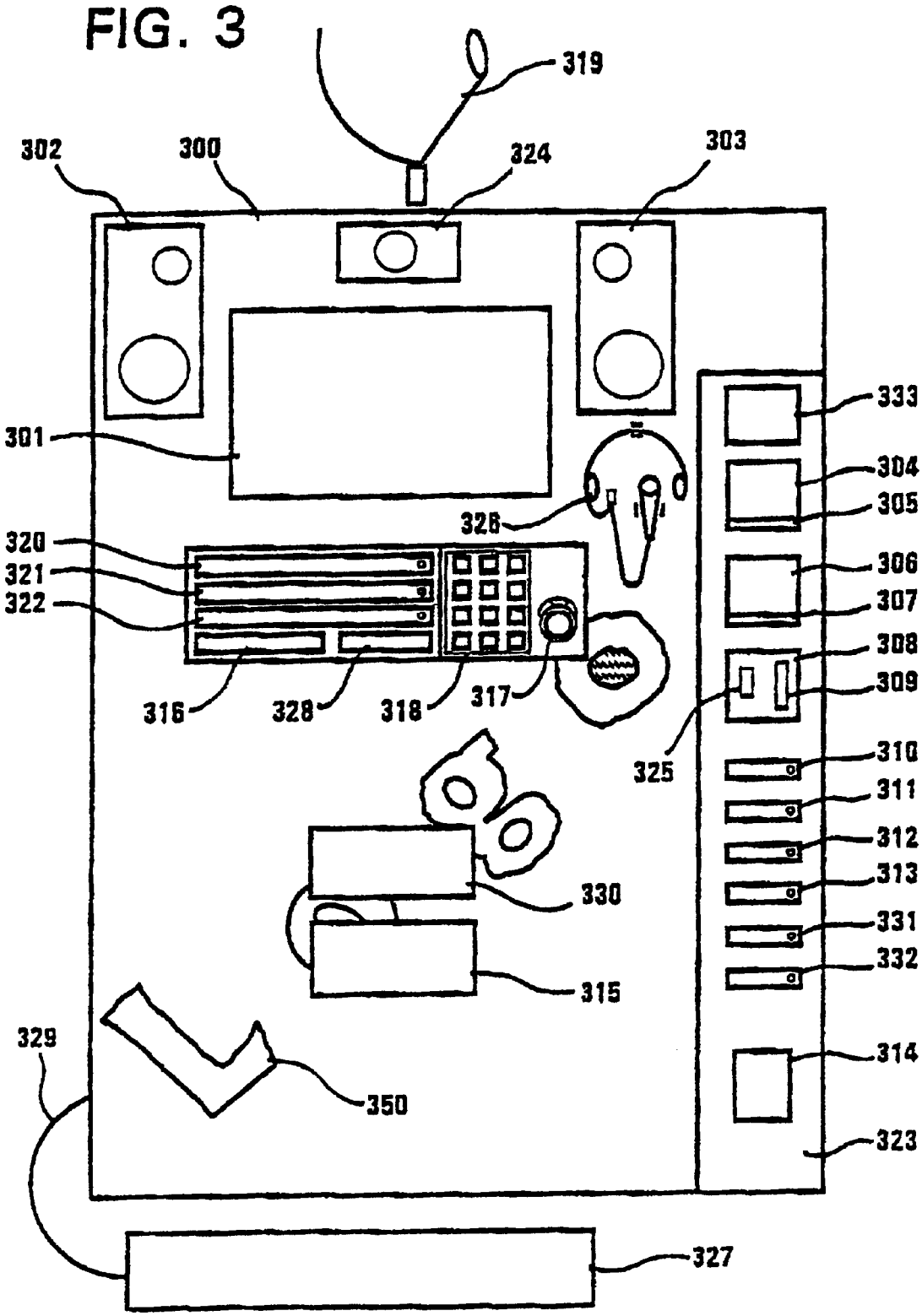
FIG. 3 is a front elevational view of the front panel portion with a logo or trademark applied to the vending machine.

FIG. 3 is a further embodiment similar to FIG. 1 except that FIG. 3 includes the panel with suitable bright light and coloring configured to display the primary product logo or trademark 350 and to increase the visibility of the vendor. The remaining elements are substantially the same as in the embodiment of FIG. 1 and are identified by the same reference number of the 300 series.

Referring to FIG. 4, the interrelationship between the various circuit components is shown. The central computer control unit 400 is connected to and operates the various components of the vending machine. The computer 400 is connected to and controls operation of the display monitor 424 screen which includes a video interface circuit 427. Two-way audio communication functions and the production of messages amplified by amplifier are played on the speakers 420 and 421 and headphones 430. The computer 400 also receives input signals and calculates the payment amount from the credit card acceptor 401, bill acceptor 402 and coin acceptor 403 (collectively identified as amount deposite acceptor 400A) and receives signals and communicates with merchandise selector switches 405, 406, 407 and 408 (collectively identified as merchandise selector switch 400B). A driving means for a coin and change return mechanism 404 and the merchandise storage and dispensing unit 409 are controlled by the computer 400. Laser-disc and CD-ROM drive 415 and 1.44 MB diskette drive 428 (collectively referred to read-write drive 400D) are connected to computer 400 for receiving and storing data and for storing suitable software for driving the computer 400. A memory unit 417 and programmable audio-video message storage unit 416 can comprise of magnetic or optical recording medium or electrically erasable and programmable read-only memory (not shown). In embodiments of the invention, computer 400 incorporates a suitably programmable microprocessor or digital signal processing unit with appropriate interface circuits as known in the art for efficient computer operation and connection to the internet.

The programmable audio-video message storage unit 416 stores all the display names of the merchandise and pricing checks, all the customer instructions in connection with the initiation and usage of the internet access and the vendor homepage or website that displays a window on the monitor 424 at the time of sale. The scratch pad memory unit 417 serves as the area where other website or homepage messages are stored temporarily while the customer browses the website or homepage. The read-write drive assembly 400D sends audio-video signals to the monitor 424 and other websites or homepages via computer 400 and records audio-video messages from other websites or homepage.

The computer 400 receives signals and data of deposited amounts of memory from the amount deposit acceptor 400A, and signals to and from the merchandise selector switch 400B. When the customer activates a selector switch 400B the computer sends a signal to actuate the merchandise storage and dispensing unit 409.

The present invention is provided with vendor preprogrammed websites selector or switches 411, 413 and 414 (collectively referred to as the programmed website selector 400C). By pressing any of the programmed website selector 400C, the computer is connected to the website and the received information is displayed on the monitor 424.

Additionally, the present invention is provided with the keypad 412 to enable the customer select a website or homepage by entering the address of the website or homepage and other necessary information into the computer 400. The keypad 412 can be used by the customer for the two-way interactive communication functions with monitor 424 and computer 400. The invention is provided with a trackball 410 or mouse that enables the customer to browse the internet for two-way interactive communication functions with the monitor 424.

The microphone 422 with audio synthesizer 425, and video camera 423 with digital synthesizer 426 provide two-way audio-video interaction communication functions. By way of example and not limitation, the microphone 422 and camera 423 may allow the customer to perform live as an audition for TV commercial or movie studio at remote website location. The amplifier 419 for the speakers 420 and 421 and headphones 430 has audio interface circuit 418 connected to the computer 400. The system of FIG. 4 also includes transmit-receive network 429 for the transmission and receiving data, audio-video signals, and access to the internet information. By way of example and not limitation, the network 429 in a remote vending machine is provided with a satellite receiver and satellite disc. Alternative network 429 is a cable or telecommunications connection.

The FIG. 4 vending machine is provided with the diskette switch 431 and the compact disc switch 432 and the media port 433 where by a blank 1.44 MB diskette and the blank compact disc are dispensed. For instance, the customer may purchase a blank compact disc afte depositing money in the amount deposit acceptor 400A which is then dispensed in a media port 433.

Figure 5:
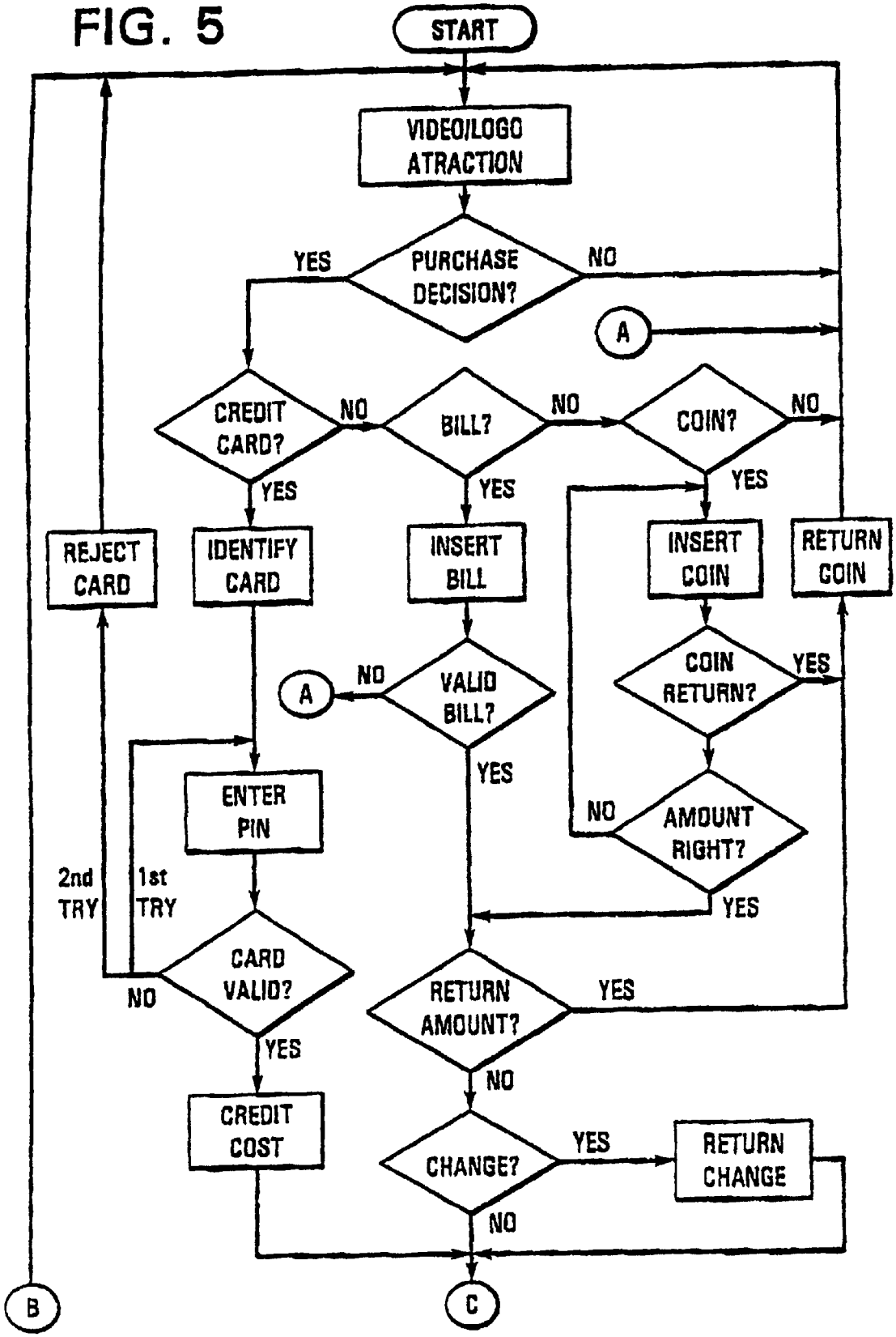
FIG. 5 and FIG. 6 show the flow block diagrams of the operation according to the present invention.
Figure 6:
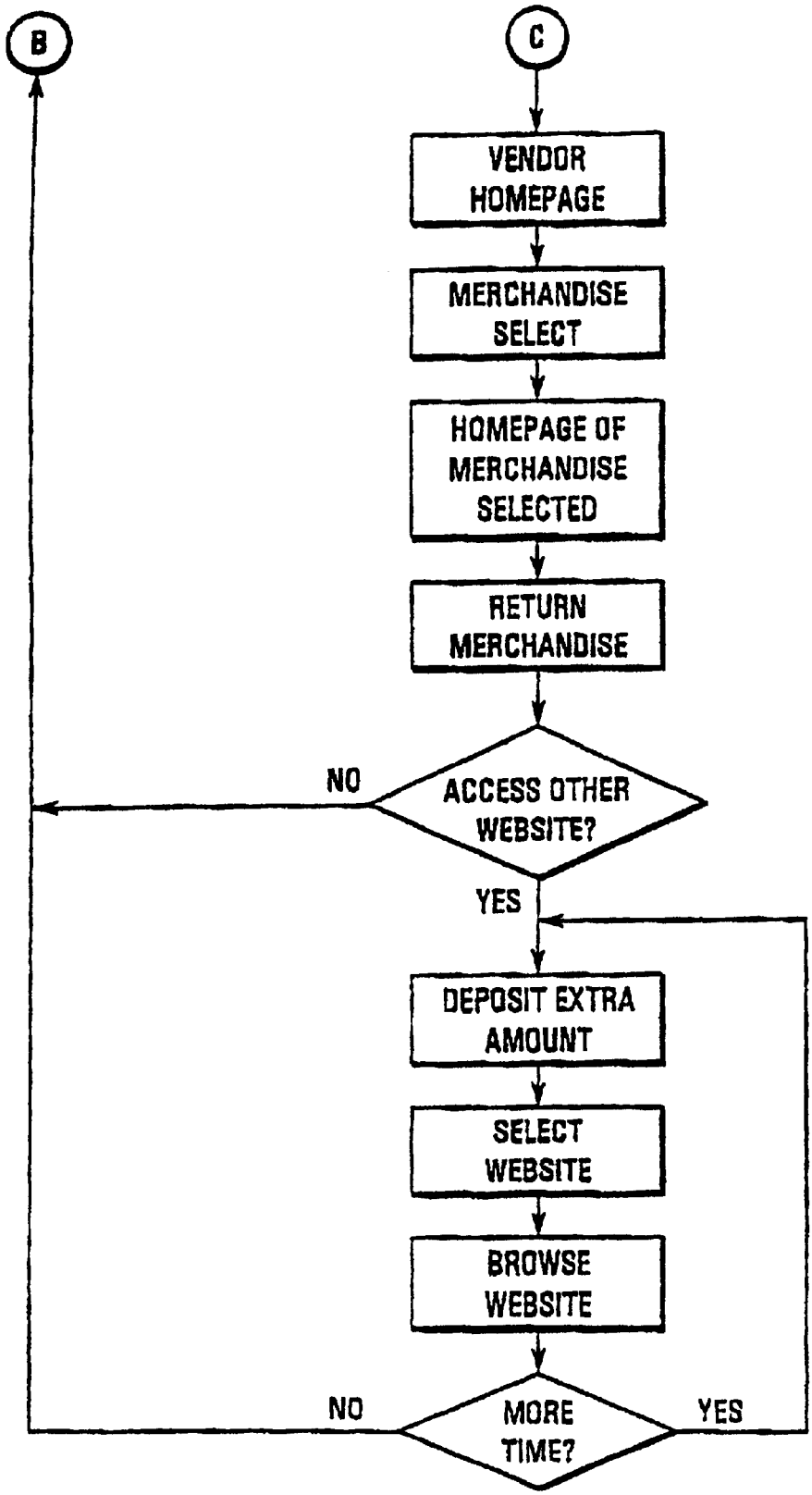

Referring to FIG. 5 and FIG. 6, the program operation of the present invention is described in more detail. As shown in FIG. 4 the computer control unit 400 through the monitor 424 periodically displays suitable advertising and publicity messages the computer memory or drives 400D when the vending machine is idle. The displayed advertising or message on the monitor 424 can be from the merchandise manufacturer vendor or the property owner of the vending location. The speakers 420 and 421 and headpones 430 play the appropriate audio corresponding to the advertising messages.

When a customer deposits an amount of money into the amount deposit acceptor 400A, the computer unit 400 senses the input and by means of signals recalled from the programmable audio-video message storage unit 416, checks the amount deposited. For credit card purchase, the computer 400 requests for and checks personal identification number, and records the credit card sales on programmable audio-video message storage 416 using standard hardware and software known in the industry.

When the customer desires to cancel a purchase, the coin return lever 425 is pulled to return the amount to the delivery receptacle 404. This also will cancel the credit card entries in the programmable audio-video message storage 416 and the vending machine returns to an idle state.

Figure 7:
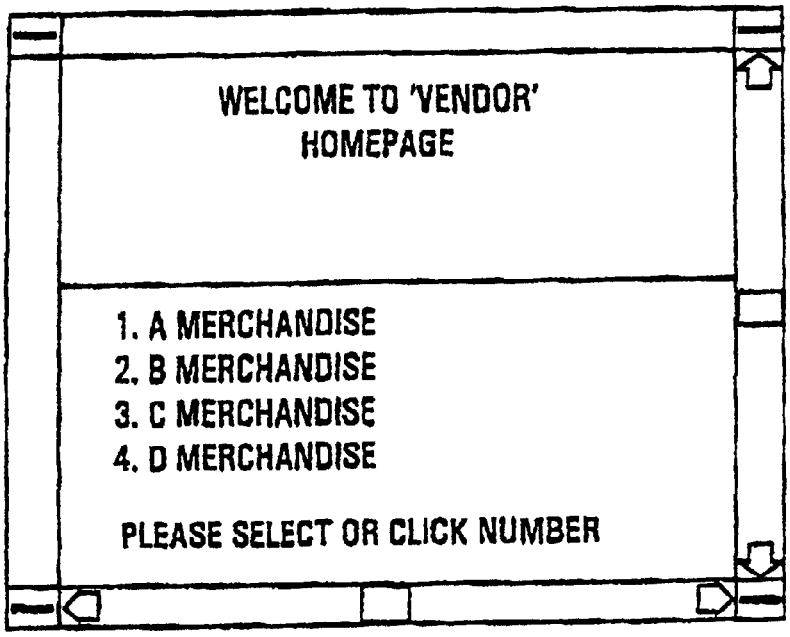
FIG. 7 shows a screen display at an initial stage when a target merchandise is to be selected.

When the full payment has been made for the selected merchandise, the computer 400 actuates the monitor 424 to display the pre-selected message which can be, for example, the homepage of the vendor. The computer 400 includes a modem and appropriate operating software for connecting the computer with an internet site. The monitor 424 then displays a series of questions for the customer to interface with the computer. FIG. 7 shows an example of the display inquiry on the monitor 424 which are recalled from the programmed audio-video message storage unit 416. The computer 400 again recalls one of the audio messages stored thereon to accompany the display inquiry in the form of spoken or synthesized words reproduced by the amplifier 419 and through the speakers 410 and 421. By way of example and not limitation, the audio message played on the speakers may be "PLEASE ENTER NUMBER FROM KEYPAD OR CLICK NUMBER USING TRACKBALL OR PRESS MERCHANDISE SELECTOR SWITCH TO SELECT MERCHANDISE."

Figure 8:
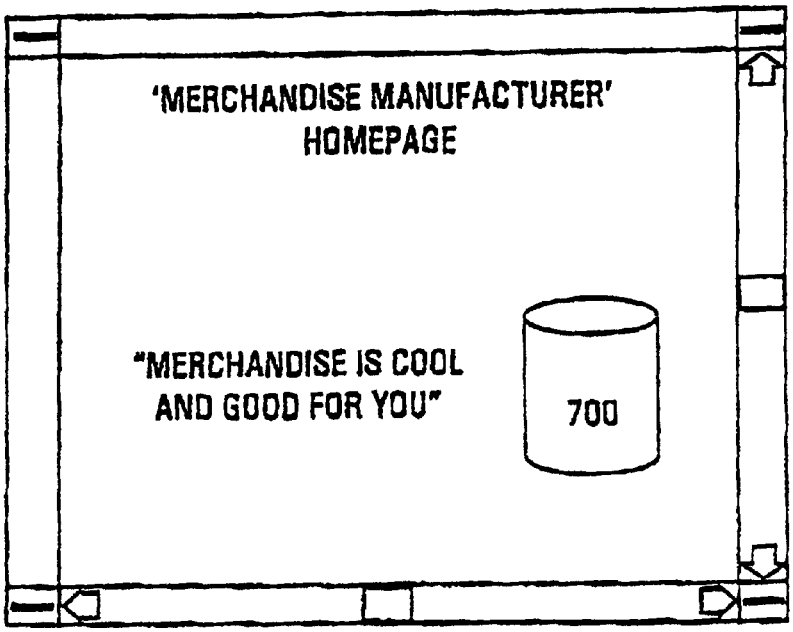
FIG. 8 shows a screen display at the scene when a merchandise is selected.
Figure 9:
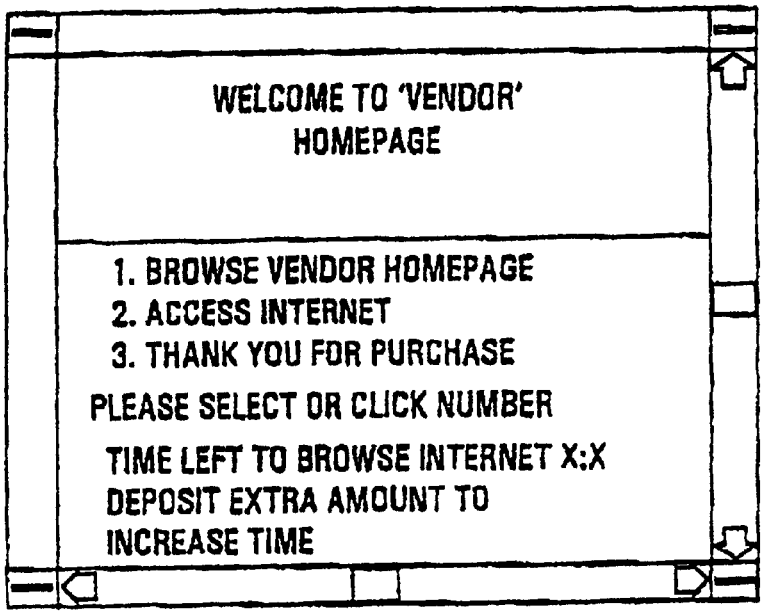
FIG. 9 shows a screen display at the scene after a merchandise has been purchased and delivered.

When the customer selects the merchandise as instructed by the displays on the monitor 424 and through the speakers 420 and 421 the computer 400 senses the action by means of the signal from the keypad 412, or the trackball 410, or from the merchandise selector switch 400B. When the merchandise is selected, the computer 400 accesses the internet provider or website of the manufacturer of the merchandise and displays the audio-visual image advertisement of the merchandise on the monitor 424 as shown on FIG. 8. By way of example and not limitation, the customer can be connected to the website of the manufacturer or distributor for news, sports, and upcoming events. The computer 400 then controls the merchandise dispense mechanism 409 to dispense the purchased item to the merchandise port. The computer then displays the messages on monitor 424 as shown in FIG. 9. The messages are recalled by the computer 400 from the programmed audio-video message storage 416. The displayed messages are accompanied by spoken or synthesized words and music reproduced by the amplifier 419 and through the speakers 420 and 421. By way of example and not limitation, the audio message played on the speakers may be "TO BROWSE VENDOR HOMEPAGE PRESS OR CLICK ONE, TO ACCESS OTHER WEBSITES PRESS OR CLICK TWO, TO END ALL OPERATIONS PRESS OR CLICK THREE."

When the customer selects No. 1 reading from the screen shown in FIG. 9, the computer 400 detects the input signal input from the keypad 412 or trackball 410. The computer 400 then displays the vendor homepage with images, messages and information for advertising and publicity on the monitor 424 as transmitted from the internet provider. The display is accompanied by spoken or synthesized words and music reproduced through the speakers 420 and 421. Using the trackball 410 the customer may browse the vendor homepage for a predetermined time. After the allotted time elapses, the display "TERMINATION" appears on the monitor 424 to end the browsing and returns the vending machine to idle state.

Figure 10:
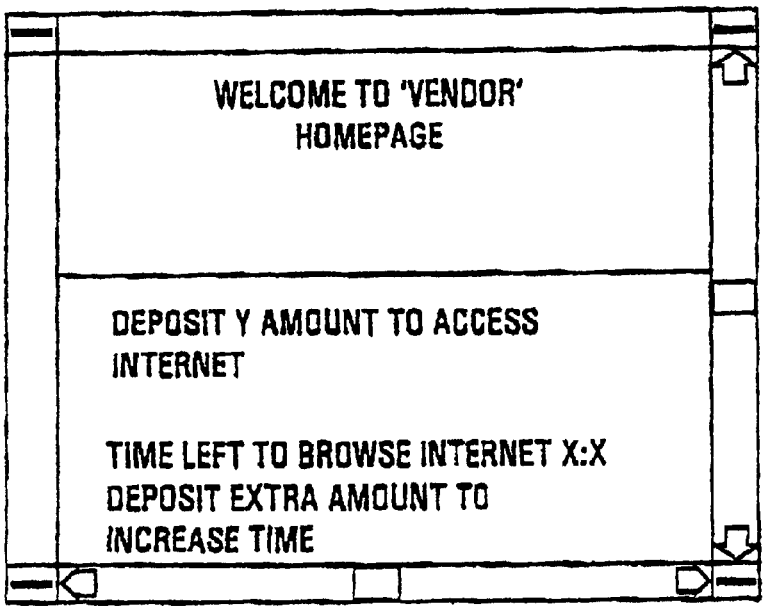
FIG. 10 shows the screen display at the scene when a selection of FIG. 9 is made.

When the customer selects No. 2 reading from the screen of FIG. 9, the computer 400 detects the input signal from the keypad 412 or trackball 410. The computer 400 displays the vendor homepage with messages and information on the monitor 424 with the messages recalled from the programmed audio-video message storage 416 and played through the speakers 420 and 421. In addition, the customer is requested to deposit amount in the amount deposit 400A to enable the customer to access other websites or homepages. The screen of FIG. 10 shows for example a message that is displayed on the monitor 424, when coin, bill or credit card is inserted into the amount deposit acceptor 400A, the computer 400 senses the action and compares the deposit amount with the amount recalled from the programmed audio-video message storage unit 416 for checking. For example, the computer 400 displays the messages on the monitor screen 424 as shown in FIG. 11.

When the customer selects No. 1 reading from the screen of FIG. 11, the computer 400 again detects the input signal from the keypad 412 or the trackball 410. The computer 400, for example, accesses the internet through the transit-receive network 429 and displays the screen of FIG. 12 on the monitor 424. When the customer selects No. 1 from the screen of FIG. 12 representing "News A Website" by using the keypad 412 or the trackball 410, for instance, the homepage of the news website is displayed on the monitor 400 with images, spoken or synthesized words reproduced by the amplifier 419 through the speakers 420 and 421. By using the trackball 410, the customer may browse the homepage of the news website.

Figure 11:
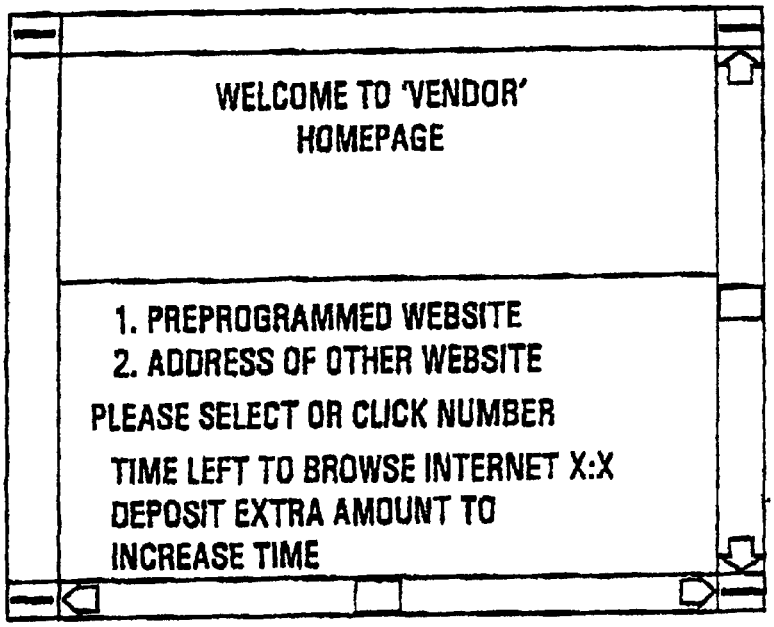
FIG. 11 shows a screen display at the scene when the scene of FIG. 10 is completed.
Figure 12:
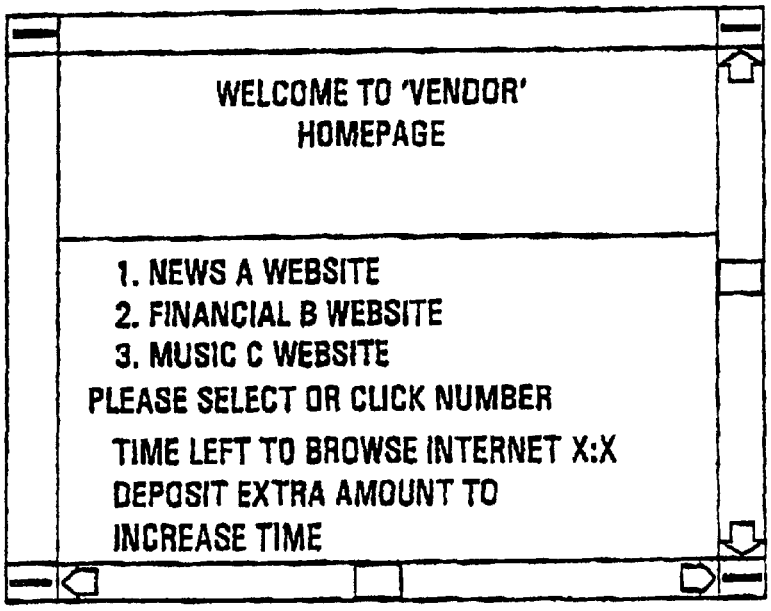
FIG. 12 shows the screen display scene when No. 1 of FIG. 11 is selected.
Figure 13:
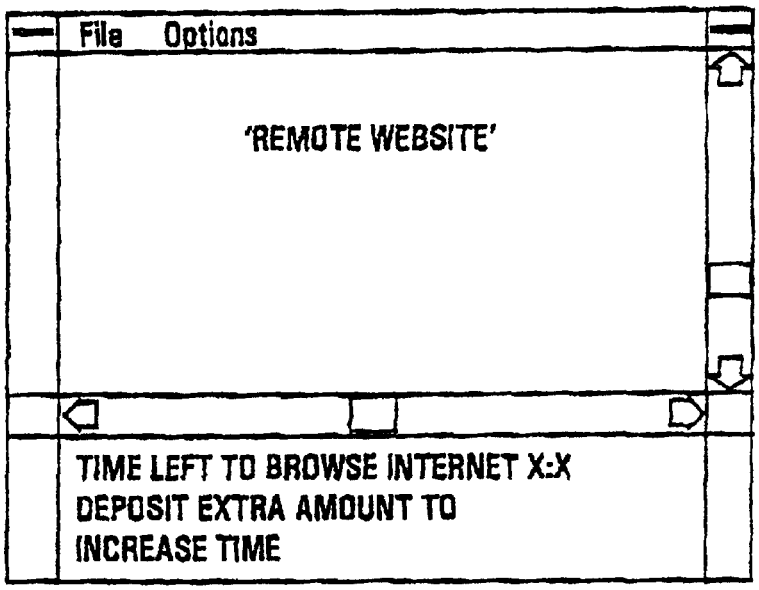
FIG. 13 shows the screen display scene when No. 2 of FIG. 11 is selected.

When the customer selects No. 2 reading from the screen of FIG. 11, the computer 400 detects and the input signal from the keypad 412 or trackball 410. The computer 400, for instance, displays the screen of FIG. 13 on the monitor 424. The message screen displayed on the monitor 424 as shown in FIG. 13 is similar to the message screen obtained from other commercial browser software available on the market. By way of example, Netscape™ commercial software may be the browsing software. The customer may then enter the address of the website by using the keypad 412. Search word or words may be entered in place of the address of the website. The monitor 424 displays the website and the customer can browse the website with the keypad 412 and the trackball 410. A message screen corresponding to the display on the monitor 424 or other messages may be produced from the speakers 410 and 421.

The display of "Time Left To Browse Websites X:X. Deposit Amount To Increase Time Left" shown in the screen of FIGS. 9 through 13 is provided to limit the operating time by the user so that the customer may deposit extra amount into the amount deposit acceptor 400A to increase browsing time. The process of depositing the amount of money and actuation of the computer is as described above. When there is more browsing time left, the customer may access as many websites as described.

An additional embodiment of the present invention provides the write drive 400D, camera 423 and microphone 422 to allow the customer a two-way interactive communication fuctions. By way of example and not limitation, the customer may access a musical studio tranmsitted to the speakers 420 and 421, selects some tracks and download the tracks onto blank compat disc or other recording medium inserted into the read-write drive 400D after depositing a payment through the amount deposit acceptor 400A to be credited to the music studio. Alternatively, the customer can download financial data onto a diskette inserted into the read-write drive 400D. Additionally, the customer may audtion live through the camera 423 and the microphone 422 for TV commercial or movie studio.

*In another embodiment, the invention is directed to a door for retrofitting an existing vending machine for sale of items selected by a customer, said door comprising: a storage unit for storing a plurality of different items for sale and a dispensing mechanism for dispensing the items from the storage unit; a selector device for selecting one or more of said items for sale by the customer; a payment-control device for receiving and detecting an amount of payment required for sale of an item and for actuating said dispensing mechanism when a payment is received to dispense a selected item; and a computer assembly connected to said storage and dispensing unit, selector device and payment control device, and having a computer, video display screen and a modem, where the computer is connected to and actuated by said selector device for automatically connecting the computer to a pre-selected internet site and automatically displaying information obtained from the internet address on the video screen for viewing by the customer.*

In a further embodiment, with music from a website, the customer may sing using the lycris appearing on the monitor 424, through the microphone 422, and may simultaneously download the whole performance onto a compact disc or diskette using the read-write drive 400D. The customer may take the recorded performance and walk away or may have the option to transmit the performance to a website that participates in accepting on-one live performances for audition and promotional commercials.

As set forth above, the present invention makes it possible for the customer to select the desired merchandise by operating in acordance with the contents of a display and simultaneously accessing websites or homepages by operating the input means in accordance with the contents of the display. Additionally, the customer may download information from websites and may perform live for the websites which can be recorded. As a result, the vending machine door of the present invention can be used to attract greater patronage then previous devices. The invention also benefits consumers by providing more access to information and also to provide two-way interactive communication fucntions.

What is claimed is:

1. A vending machine for sale of items selected by a customer, said vending machine including a *retrofit* door for retrofitting *to* an existing vending machine, said [door] *vending* comprising:

a storage unit for storing a plurality of items for sale and a dispensing mechanism for dispensing the items from said storage unit;

*the retrofit door comprising:*

(*a*) a selector device for selecting one or more of said items for sale by a customer;

(*b*) a payment-control device for receiving and detecting an amount of payment required for sale of an item and for actuating said dispensing mechanism when a payment is received to dispense a selected item; and (*c*) a computer assembly connected to said storage *unit* and dispensing [unit] *mechanism*, selector device and payment control device and having a computer, video display screen and a communication network, whereby said computer is connected to and actuated by said selector device for automatically connecting said computer to a preselected internet site *in response to purchase of the selected item, dispensing the selected item,* and automatically displaying information obtained from said internet site on said video screen for viewing by the customer, said computer assembly further including customer actuating means for enabling a customer to interface with said computer*; said computer having programming responsive to payment of an additional amount in excess of the amount required to purchase the selected item to provide the customer access to at least one website of the customer's choice on the internet through interaction with the vending machine after the selected item is dispensed.*

2. The vending machine of claim 1, wherein said communication network comprises a modem and said computer assembly further includes a telephone line connection for connecting said computer to said internet site.

3. The vending machine of claim 1, wherein said computer comprises software for selectively connecting said computer to a plurality of different internet site, and being connected to said selector [means] *device* for automatically connecting said computer to a specific internet site in response to a selected item.

4. The vending machine of claim 1, said computer assembly further comprising data storage means connected to said selector device for displaying selected stored information in response to a selection of items by a customer.

5. The vending machine of claim 4, wherein said computer displays information from said data storage means at idle times of said vending machine.

6. The vending machine of claim 5, further comprising a speaker for broadcasting audio signals, where said data storage means transmits signals to said video screen and speaker to display advertising information from said data storage means.

7. The vending machine of claim 1, said computer further comprising user operated keypad and trackball for operating said computer to connect said computer to an internet side selected by said customer.

8. The vending machine of claim 1, said computer further including speakers for receiving audio transmissions from said internet site.

9. The vending machine of claim 1, said computer further comprising an audio display device, a microphone and audio recording device for recording audio by said customer.

10. The vending machine of claim 9, wherein said computer further comprises a camera and video recording device for recording an image of said customer.

11. The vending machine of claim 1, wherein said computer further comprises a central control unit for an audio-visual connection to an internet site;

a transmission unit for transmitting an audio-visual signal from said computer to said internet site;

a receiving unit for receiving audio-visual signals from said internet site; and a recording unit for recording and storing said audio-visual signals.

12. A *retrofit* door *assembly* for retrofitting an existing vending machine for sale of items selected by a customer, said *retrofit* door *assembly* comprising:

a storage unit for storing a plurality of different items for sale and a dispensing mechanism for dispensing the items from *said* storage unit;

a selector device for selecting one or more of said items for sale by the customer;

a payment-control device for receiving and detecting an amount of payment required for sale of an item and for actuating said dispensing mechanism when a payment is received to dispense a selected item; and a computer assembly connected to said storage [and dispensing] unit *and dispensing mechanism*, selector device and payment control device, and having a computer, video display screen and a modem, whereby said computer is connected to and actuated by said selector device for automatically connecting said computer to a pre-selected internet site *in response to purchase of the selected item, dispensing the selected item,* and automatically displaying information obtained from said internet [address] *site* on said video screen for viewing by the customer*; said computer having programming responsive to payment of an additional amount in excess of the amount required to purchase the selected item to provide the customer access to at least one website of the customer's choice on the internet after the selected item is dispensed.*

*13. A retrofit door assembly for retrofitting an existing vending machine for dispensing of at least one drink selected by a customer, said retrofit door assembly comprising:*

*a door having a computer, video screen and communication network operatively connected to the Internet whereby a customer may view website content on said video screen,*

*a delivery port for dispensing said at least one drink selected by a customer to the customer, an access portal to the Internet on said door for interaction of the customer through the Internet, so that the customer may choose a website to view on the video screen; said computer is connected to and actuated by a selector device for automatically connecting said computer to a preselected Internet site in response to purchase of a selected drink, dispensing the selected drink and automatically displaying information obtained from said Internet site on said video screen for viewing by the customer; said computer having programming responsive to payment of an additional amount in excess of an amount required to purchase a selected drink to provide the customer access to at least one website of the customer's choice on the Internet after dispensing a purchased drink.*

*14. A vending machine comprising the retrofit door assembly of claim 13, said vending machine further including a storage unit for storing said at least one drink for purchase by a customer.*

*15. The vending machine of claim 14, wherein said door further comprises a dispensing mechanism for dispensing said at least one drink.*

*16. The vending machine of claim 14, wherein at least one of a telephone connection, cable, modem, antenna, and satellite dish is provided for interacting with other transmitters and receivers.*

*17. The vending machine of claim 16, wherein an other receiver is capable of receiving and utilizing data.*

*18. The vending machine of claim 14, wherein said purchased drink is at least one drink selected from the group consisting of drinks in cans and bottles.*

*19. The vending machine of claim 14, further comprising:*

*at least one mechanism selected from the group including data storage unit, programmable audio-video message storage unit, laser-disc, read-write CD-ROM, read only memory recording medium, magnetic media and diskette for storage of data and recording, storage and playback of audio and video signals,*

*wherein a customer is enabled respectively to upload and download audio and video signals from and to said mechanism to and from websites and homepages, and to send and receive data from and to said mechanism to and from other data transmitters or receivers.*

*20. The vending machine of claim 19, further comprising a camera connected to a computer for generating video signals, and*

*a microphone connected to a computer for generating audio signals, wherein said microphone generated audio and camera generated video signals are recorded alone or in combination with already recorded audio and visual signals by said at least one mechanism.*

*21. The vending machine of claim 19, wherein said programmable audio-video message storage unit comprises at least one of an optical recoding medium, a magnetic recording medium, and an electrically eraseable and programmable read-only memory recording medium.*

*22. The vending machine of claim 14, further comprising: a camera connected to the computer for generating video signals;*

*a microphone connected to said computer for generating audio signals; and*

*at least one audio-video mechanism connected to said computer for recording said audio and video signals.*

*23. The vending machine of claim 22, wherein said signals provide a two-way communication via the Internet.*

*24. The vending machine of claim 23, wherein said at least one audio-video mechanism is selected from the group consisting of data storage mechanism, laser-disc, read-write CD-ROM, and diskette, whereby said signals are recorded by said at least one audio-video mechanism and dispensed to the customer.*

*25. The vending machine of claim 14, wherein said vending machine is connected to an Internet service provider by a communication network system which enables two-way multimedia interactive communication with a customer.*

*26. The vending machine of claim 14, further comprising transmitting and receiving network communication means and content uploading and downloading means to and from websites so as to enable communication between a customer and an owner or operator of said vending machine.*

*27. The vending machine of claim 14, further comprising programmable means to connect the machine to a website or homepage of a manufacturer of the drink purchased.*

*28. The vending machine of claim 14, further comprising programmable means to connect the machine to a website or homepage of an owner or operator of the vending machine.*

*29. The vending machine of claim 28, further comprising means to download a communication onto a mobile recording medium.*

*30. The vending machine of claim 14, further comprising at least one of an audio or a video interface circuit for two-way interactive communication.*

*31. The vending machine of claim 30, wherein the interface circuit for two-way interactive communication is a video interface circuit.*

*32. The vending machine of claim 14, further comprising a credit card acceptor.*

*33. The vending machine of claim 14, further comprising means for accepting payment.*

*34. The vending machine of claim 33, wherein the payment comprises at least one of coins, bills and credit cards.*

*35. The vending machine of claim 14, further comprising means for accepting visual input.*

*36. The vending machine of claim 35, further comprising means for converting said visual input to digital form.*

*37. The vending machine of claim 36, further comprising a communications network to connect the vending machine to a pre-programmed financial website.*

*38. The vending machine of claim 37, further comprising means to download information from said financial website.*

*39. The vending machine of claim 14, further comprising an amount deposit acceptor.*

*40. The vending machine of claim 14, further comprising a payment control device.*

*41. The vending machine of claim 14, further comprising a computer activation circuit in which the computer is connected to an Internet provider via the Internet before the drink is dispensed.*

*42. The vending machine of claim 14, further comprising software for automatically connecting the vending machine to a specific Internet website.*

*43. The vending machine of claim 42, wherein the specific Internet website transmits and receives at least one of data, audio or video signals.*

*44. The vending machine of claim 14, further comprising means to display advertising when the vending machine is idle.*

*45. The vending machine of claim 14, further comprising a transmit-receive circuit connecting the vending machine with other transmitters and receivers.*

*46. The vending machine according to claim 14, wherein said at least one item selected is a drink in bottles.*

*47. The retrofit door assembly for retrofitting an existing vending machine of claim 13, wherein the communication network comprises a modem on said door.*

*48. The retrofit door assembly of claim 13, further comprising a money delivery port on said door.*

*49. The vending machine of claim 48, wherein money is dispensed through said money delivery port.*

*50. The retrofit door assembly for retrofitting an existing vending machine of claim 13, wherein said door further comprises means for two-way interactive communications by a customer with the Internet.*

*51. The retrofit door assembly for retrofitting an existing vending machine according to claim 50, wherein the interactive communications are interactive visual communications.*

*52. The retrofit door assembly for retrofitting an existing vending machine according to claim 13, wherein the door further comprises at least one of a blank compact disk and a blank diskette delivery port.*

*53. The retrofit door assembly for retrofitting an existing vending machine according to claim 13, wherein the door further comprises speakers.*

*54. The retrofit door assembly for retrofitting an existing vending machine according to claim 13, wherein the door further comprises a keypad.*

*55. The retrofit door assembly for retrofitting an existing vending machine according to claim 13, wherein the door further comprises a trackball.*

*56. The retrofit door assembly for retrofitting an existing vending machine according to claim 13, wherein the door further comprises a camera.*

*57. The retrofit door assembly for retrofitting an existing vending machine according to claim 13, wherein the door further comprises a programmable selection panel for customer selection of websites or homepages to transmit-receive data, music, video and audio and to provide visual and digital recording functions.*

*58. The retrofit door assembly for retrofitting an existing vending machine according to claim 13, wherein the door further comprises a headphone.*

*59. The retrofit door assembly for retrofitting an existing vending machine according to claim 13, wherein the door further comprises a microphone.*

*60. The retrofit door assembly for retrofitting an existing vending machine according to claim 13, wherein the door further comprises a credit card reader.*

*61. The retrofit door assembly for retrofitting an existing vending machine according to claim 13, wherein the door further comprising means for displaying pricing information for the Internet.*

*62. The retrofit door assembly for retrofitting an existing vending machine according to claim 13, wherein the door further comprises a scratch pad memory unit.*

*63. The retrofit door assembly for retrofitting an existing vending machine according to claim 13, wherein the door further comprising means to display time left to browse websites.*

*64. The retrofit door assembly for retrofitting an existing vending machine according to claim 13, further including a programmable selection panel for selecting websites or homepages.*

*65. The retrofit door assembly for retrofitting an existing vending machine according to claim 13, further including means to accept input from a customer.*

*66. The retrofit door assembly for retrofitting an existing vending machine according to claim 65, wherein the computer is also connected to the means to accept input from a customer.*

*67. The retrofit door assembly for retrofitting an existing vending machine of claim 66, wherein the computer displays a homepage or website, together with information from an Internet provider.*

*68. The retrofit door assembly for retrofitting an existing vending machine according to claim 13, said door further comprising at least one of a programmable microprocessor and an interface circuit.*

*69. The retrofit door assembly for retrofitting an existing vending machine according to claim 13, said door further comprising at least one of a digital signal processing unit and an interface circuit.*

*70. The retrofit door assembly for retrofitting an existing vending machine of claim 13, further comprising software for browsing the Internet.*

*71. The retrofit door assembly for retrofitting an existing vending machine of claim 13, further comprising software for connecting the computer with an Internet site.*

*72. The retrofit door assembly for retrofitting an existing vending machine of claim 13, wherein an Internet site is selected from the group consisting of an Internet provider, a manufacturer of the item, a vendor of the item, a website specified by the customer, an owner of the vending machine, an operator of the vending machine, news websites, financial websites, music websites and a website of the property owner where the vending machine is located.*

*73. The door for retrofitting an existing vending machine of claim 13, further comprising an escutcheon plate and a transparent plastic panel with back lighting to display a logo or trademark of a vendor.*

*74. The door for retrofitting an existing vending machine of claim 13, further comprising an interface to a communication network to access an on-line computer service, wherein said service is capable of transmitting and receiving, via a communication network, a request for service by a customer and a response to said request.*

*75. The door for retrofitting an existing vending machine of claim 13, further comprising a mouse.*

*76. A method of providing a customer with access to the Internet via a vending machine, said method comprising:*

*1.) providing a vending machine to vend at least one physical item for purchase by a customer;*

*2.) purchasing said at least one physical item connects the customer, via the Internet, to at least one pre-selected website;*

*3.) accessing at least one additional website of the customer's choice after said at least one physical item has been purchased and dispensed, said accessing comprising at least one of inserting money or credit card information into the vending machine in excess of an amount required for the purchase of said at least one item; and customer input of data to a computer.*

*77. The method of claim 76, including connecting said computer to a website via a modem.*

*78. The method of claim 76, wherein said customer input comprises activating at least one key of a keyboard.*

*79. The method of claim 76, including actuating at least one of audio, video and multi-media capabilities associated with the vending machine.*

*80. The method of claim 76, wherein said access to the Internet is effected by inserting money in the form of coin or currency into said vending machine.*

*81. The method of claim 76, wherein said access includes providing means for two-way interactive visual communications by a customer with the Internet.*

*82. The method of claim 76, further including the step of providing means to allow the customer to download data, audio or video information from the Internet and take it away from the vending machine in the form of magnetic or optical storage media.*

*83. The method of claim 76, including providing the vending machine with a camera.*

*84. The method of claim 76, wherein the step of providing said vending machine is in the form of an existing vending machine with a retrofit door.*

*85. The method of claim 84, where a computer is assembled onto the retrofit door for the vending machine and said computer also controls various components of the vending machine, in addition to Internet access.*

*86. The method of claim 76, wherein a customer may transmit data on the Internet from the customer's own magnetic or optical storage mediums insertable into drives in the vending machine.*

*87. The method of claim 76, further including providing at least one of telephone, cable or satellite communications on said vending machine.*

*88. The method of claim 76, further including providing a microphone on the vending machine.*

*89. The method of claim 76, further comprising the step of incorporating a timing device into the vending machine to limit the time the customer is operatively connectable, via the Internet, to at least one of preselected websites.*

*90. The method of claim 76, wherein the purchasing is in response to actuation of a credit card reader and check of personal identification number.*

*91. A method of attracting greater patronage to a vending machine for drinks, said method comprising:*

*providing a vending machine for drinks with a retrofit door assembly, the retrofit door assembly comprising a door with a video screen, at least one of a credit card reader or a money acceptor, and at least one customer input device,*

*automatically connecting a customer to at least one predetermined website and displaying the at least one predetermined website on the video screen in response to actuation of the money acceptor or credit card reader in an amount required to purchase a drink;*

*upon purchase of the drink, causing a drink to be vended to the customer and providing a predetermined time period for which the customer is automatically connected to at least one predetermined website; and, thereafter providing the customer access to at least one website of the customer's choice on the Internet/world wide web through interaction with said vending machine by the payment of an additional amount in excess of the amount required to purchase the drink, which customer's choice of website is displayed on the screen.*

*92. The method of claim 91, wherein at least one predetermined website displays at least one of informational, entertainment or advertising.*

*93. The method of claim 91, wherein the customer input device is at least one selected from the group consisting of a keypad, trackball and mouse.*

* * * * *

UNITED STATES PATENT AND TRADEMARK OFFICE

CERTIFICATE OF CORRECTION

PATENT NO. : RE41,543 E
APPLICATION NO. : 09/686626
DATED : August 17, 2010
INVENTOR(S) : James A. Satchell, Jr. et al.

It is certified that error appears in the above-identified patent and that said Letters Patent is hereby corrected as shown below:

In The Specification:

Column 1, after the Heading "CROSS-REFERENCE TO RELATED APPLICATIONS" insert:

--*The present reissue patent issued from an application that is one of a family of divisional reissue applications resulting from Patent 5,822,216, issued October 13, 1998. The present reissue application has issued without the cross reference to the other reissue application(s) of the family which is required pursuant to 37 CFR 1.177(a)*

*NOTICE: More than one reissue application has been filed for the reissue of patent 5,822,216. The reissue applications are serial number 09/686,626 filed October 12, 2000 and serial number 12/765,205 filed April 22, 2010.* --

Column 10, line 57 (Claim 1, Line 4) insert -- *machine* -- before "comprising";

Column 13, line 29 (Claim 21, Line 3) change "*recoding*" to -- *recording* --

Signed and Sealed this
First Day of February, 2011

David J. Kappos

David J. Kappos
*Director of the United States Patent and Trademark Office*